United States Patent [19]
Lindner et al.

[11] Patent Number: 5,357,684
[45] Date of Patent: Oct. 25, 1994

[54] CENTERING DEVICE FOR A MECHANICAL PROBE

[75] Inventors: Matthias Lindner, Bad Nauheim; Michael Philipp, Feldatal; Heinz-Eckhard Habermehl, Lauterbach, all of Fed. Rep. of Germany

[73] Assignee: Leitz Messtechnik GmbH, Wetzlar, Fed. Rep. of Germany

[21] Appl. No.: 13,740

[22] Filed: Feb. 4, 1993

[30] Foreign Application Priority Data

Aug. 28, 1990 [DE] Fed. Rep. of Germany ....... 4027136
Feb. 15, 1992 [DE] Fed. Rep. of Germany ....... 4204632

[51] Int. Cl.⁵ .................................................. G01B 5/20
[52] U.S. Cl. ........................................ 33/559; 33/556; 33/DIG. 2
[58] Field of Search ............... 33/559, 556, DIG. 2, 33/503

[56] References Cited

U.S. PATENT DOCUMENTS

| | | |
|---|---|---|
| 2,876,553 | 3/1959 | Tomkow .................. 33/DIG. 2 |
| 3,945,124 | 3/1976 | Jacoby et al. ................ 33/559 |
| 4,679,332 | 7/1987 | Luethi ........................ 33/559 |
| 5,103,572 | 4/1992 | Ricklefs ...................... 33/559 |

FOREIGN PATENT DOCUMENTS

| | | |
|---|---|---|
| 0351713 | 1/1990 | European Pat. Off. . |
| 1004516 | 3/1956 | Fed. Rep. of Germany . |
| 2948712 | 6/1981 | Fed. Rep. of Germany . |
| 481367 | 12/1967 | Switzerland . |
| 1095028 | 5/1984 | U.S.S.R. .................... 33/556 |

*Primary Examiner*—Christopher W. Fulton
*Attorney, Agent, or Firm*—Foley & Lardner

[57] ABSTRACT

The centering device for a mechanical probe comprising a driver and two restoring member acting thereon in opposite directions, wherein only one, possibly multi-part, stop is provided for a first restoring member. In the position of rest, the first restoring member lies against the stop exerts, at least near the position of rest, a restoring force twice as great as that exerted by the second restoring member. Springs or fluid pistons are provided as restoring members. They can briefly exert a shaking force on the driver.

12 Claims, 3 Drawing Sheets

CENTERING DEVICE FOR A MECHANICAL PROBE

BACKGROUND OF THE INVENTION

This application is a continuation-in-part under 35 U.S.C. §120 of prior copending application No. PCT/DE91/00642,which was filed on Aug. 10, 1991, and designates the United States.

The invention relates to a centering device for the feeler pin in a mechanical probe, comprising a driver, connected to the feeler pin, and two restoring means acting thereon in opposite directions.

A centering device of this kind is known from German Patent Specification 23 56 030, particularly claim 2 and FIG. 1.

In conjunction with the design of the driver as a flexural bar, it there serves primarily for the variation of the spring constant in dependence on travel.

At its end the driver carries a ball. Springs with the same spring constant act on that ball on both sides through plane pressure members. An arrangement of three balls acts on both pressure members independently of one another as first and second stops.

In order to ensure faultless centering, free from hysteresis, in the normal position, all contact points provided between the driver ball, the balls of the stops, and the pressure members must be in accurate contact at the same time.

This is possible only with heavy expense for manufacture of precision balls and optical quality planeness of the pressure members.

During use this quality is necessarily impaired by wear, by the action of impacts and friction between the driver ball and the pressure members.

The plane pressure members of the restoring means always lie in frictional contact with the driver ball head. This frictional contact gives rise to frictional forces between the surface of the ball and the plane pressure surface when the driver deflects and when it is returned to its normal position.

The driver is deflected through the action of external forces which, because of the lever arm of the feeler connected to the driver, are considerably greater than said frictional forces. The forces for the return to the normal position must however be applied by spring forces within the probe, which are composed of the restoring forces of the centering device and the spring constant in the case of a measuring feeler. These forces cannot be increased at will, since they have a direct effect on the pressure with which the feeler is pressed against a workpiece, in respect of which limits must be set in order to avoid damage.

The frictional forces must therefore be taken into account in the design, and particular attention must be paid to the transition from sliding friction during the return movement to the stationary friction in the normal position. In a concrete example of construction of a measuring feeler repeated measurements have shown that the reproducibility of the normal position of the driver, and therefore the zero position of the feeler, is burdened with an uncertainty of about ±0.4 μm.

The problem of zero position uncertainty in probes of the switching type is known per se from DE 38 24 548 A1. As a solution it is proposed to cause the feeler to vibrate during a predetermined period of time after each probing operation. The aim is thus to "shake" the feeler into its bearings, particular mention being made of the excitation of a piezoelectric oscillator as the source of the shaking action. The oscillation imparted to the feeler for a short time after it has dropped back into its bearings converts the stationary friction into motional friction, which is considerably lower, so that the restoring forces of the feeler system are sufficient for further centering in the bearing. These interrelationships are general knowledge in precision mechanics, particularly for lens centering by the bell clamp method (DE 1 004 516 B1).

The problem underlying the invention is therefore that of providing a centering device of the type defined, which, while having the same precision, can be produced at markedly lower cost. Increased hysteresis due to wear during protracted use should not occur. In addition, zero position accuracy should be increased, particularly in the case of use in measuring feelers.

SUMMARY OF THE INVENTION

This problem is solved by the defining features of the present invention, which provides a centering device for a feeler pin in a mechanical probe comprising a driver, connected to the feeler pin; and first and second restoring means acting on the driver in opposite directions, wherein only one stop is provided for the first restoring means and no stop is provided for the second restoring means, and wherein the first restoring means, which in a position of rest lies against the stop, exerts, at least close to the position of rest, a restoring force on the driver twice as great as that exerted by the second restoring means.

Advantageous embodiments are illustrated in the drawings and are described in greater detail below.

The embodiment utilizing springs, particularly spiral springs, is particularly simple. The spring restoring force increases with the deflection.

With fluid technology, on the other hand, the restoring force is independent of deflection. The fluidic mounting provides a particularly jerk-free movement through purposeful use of the leakage between piston and cylinder. Using compressed air as the fluid entails no problems, since it is in any case produced for air bearings and the like in coordinate measuring machines and gives rise to no contamination problems.

There is an advantageous effect on zero position accuracy for the restoring means to exert briefly a shaking force on the driver. This shaking force is advantageously applied shortly before the deflection of the driver. In the case of fluid restoring means, the fluid pressure may for this purpose be pulsating.

BRIEF DESCRIPTION OF THE DRAWINGS

The invention will be further explained with reference to the drawings, which are incorporated into and constitute a part of the specification, and in which.

DETAILED DESCRIPTION OF THE PREFERRED EMBODIMENTS

According to the invention, only one, possibly multipart, stop is provided for the restoring means; and the first restoring means, which in the position of rest lies against the stop, exerts a restoring force twice as great as that exerted by the second restoring means.

Figure 1:
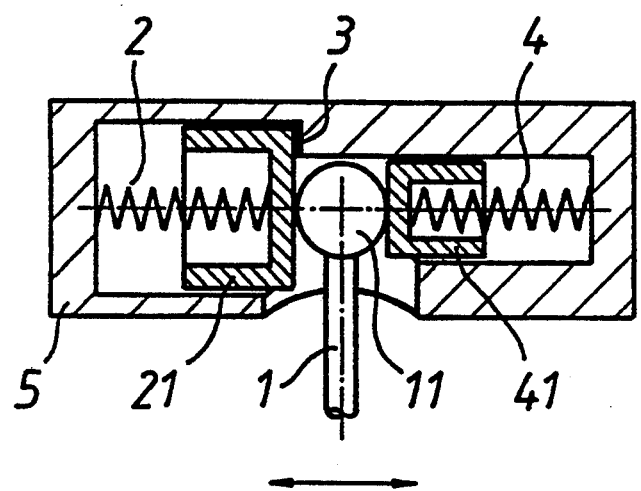
FIG. 1 illustrates schematically the embodiment utilizing a spiral spring.

In FIG. 1 a driver 1 carrying a ball 11 at its end projects into a casing 5, in which a coil spring 2 presses a pressure member 21 against a stop 3 with a spring force 2F. The pressure member 21 bears guide surfaces for non-tipping guidance in the casing 5 and has a substantially flat pressure surface which faces the stop 3 and the ball 11.

On the opposite side of the ball 11 a second coil spring 4 is disposed whose spring force F is half that of the first coil spring 2. It acts on a second pressure member 41 which is always in contact with the ball 11.

It is important that in the normal position of the centering device, in which the pressure member 21 is simultaneously in contact with the stop 3 and with the ball 11 and the latter is in contact with the pressure member 41, the spring force of the first coil spring 2 is twice as great as and directed oppositely to that of the second coil spring 4.

When the ball 11 deflects to the right towards the second coil spring 4, the ball 11 loses contact with the pressure member 21, which is held back by the stop 3, and the restoring force of the second coil spring 4 comes into action.

When the ball 11 deflects to the left towards the first coil spring 2, the latter exerts twice the restoring force. Since the second pressure member 41 is however not restrained by a stop, the spring force of the second coil spring 4 acts counter to said restoring force, so that actually the difference between the two spring forces acts, that is to say a restoring force equal to that exerted in the case of deflection to the right.

With prestressed springs 2 and 4 the action is the same if the spring forces in the normal position are selected to be twice as great for the first spring 2 as for the second spring 4, and to a certain extent, for small deflections, the restoring force is then constant and not affected by the spring constants.

Figure 4:
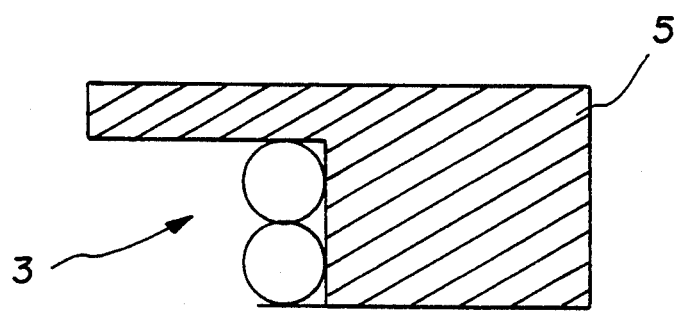

The stop 3 is shown as a simple stop surface. An embodiment utilizing three-point contact, for example by means of balls, as illustrated in FIG. 4, is however just as expedient.

Figure 2:
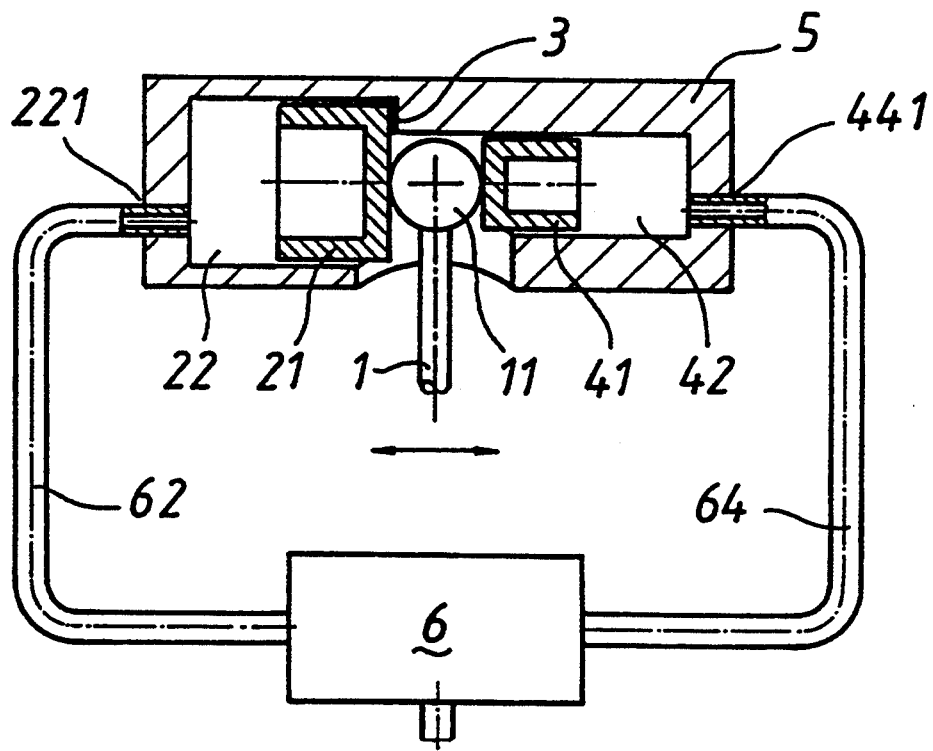
FIG. 2 illustrates schematically the embodiment utilizing fluid piston and cylinder devices.

FIG. 2 shows the embodiment utilizing fluid technology restoring means.

The pressure members 21 and 41 are in the form of pistons and move in cylinders 22 and 42 which are disposed in the casing 5. By way of inlets 221 and 441 and pressure lines 62 and 64 said cylinders are in communication with a common pressure tank 6. The pressure tank 6 is connected to feed and control or regulating devices of known type (not illustrated).

Compressed air at moderate pressure, such as is supplied in coordinate measuring machines, inter alia for air bearings, is advantageous as the fluid. The piston/cylinder seals need not then be particularly leaktight, or may be intentionally in the form of throughflow air bearings in a known manner, without contamination problems being caused by the fluid. However, it is obviously also possible to use hydraulic fluids. Problems due to friction and tilting are avoided by using spherical pistons.

The driver 1 with its ball 11 and the stop 3 are as shown in FIG. 1. The cross-section, loaded by fluid as pressure medium, of the first piston 21 is twice as large as the corresponding cross-section of the second piston 41.

On deflection of the driver 1 to the right the restoring force acting on the ball 11 consists of the product of the pressure of the fluid and the cross-sectional area of the pressure member 41. In this case the pressure member 21 is held fast by the stop 3 and is ineffective.

On deflection of the driver 1 to the left, the restoring force acting on the ball 11 consists of the product of the same pressure of the fluid and the cross-sectional area, which is twice as large, of the pressure member 21. This force is counteracted by the full force of the pressure member 41, which is not held back by a stop and is pressed in the same direction as the ball 11.

The sum of the actions of the two pressure members 21 and 41 produces the oppositely directed but equally great restoring force as in the case of deflection of the lever to the right.

The restoring force can without difficulty also be modified during operation by varying the pressure in the pressure tank 6. No strict requirements are imposed here in respect of stability of pressure, because this has only a proportional action on the amount of the restoring forces but has no effect on the hysteresis-free determination of the normal position.

Overall, only moderate standards are required in respect of the accuracy of all components, the essential need being to ensure jerk-free movability of the pressure members 21 and 41.

Wear on the ball 11, stop 3 and the pressure members 21 and 41 may, it is true, lead to displacements of the normal position, but cannot lead to increasing hysteresis, or in the extreme case to intermittent contact, since said normal position is always determined frictionally.

Figure 3:
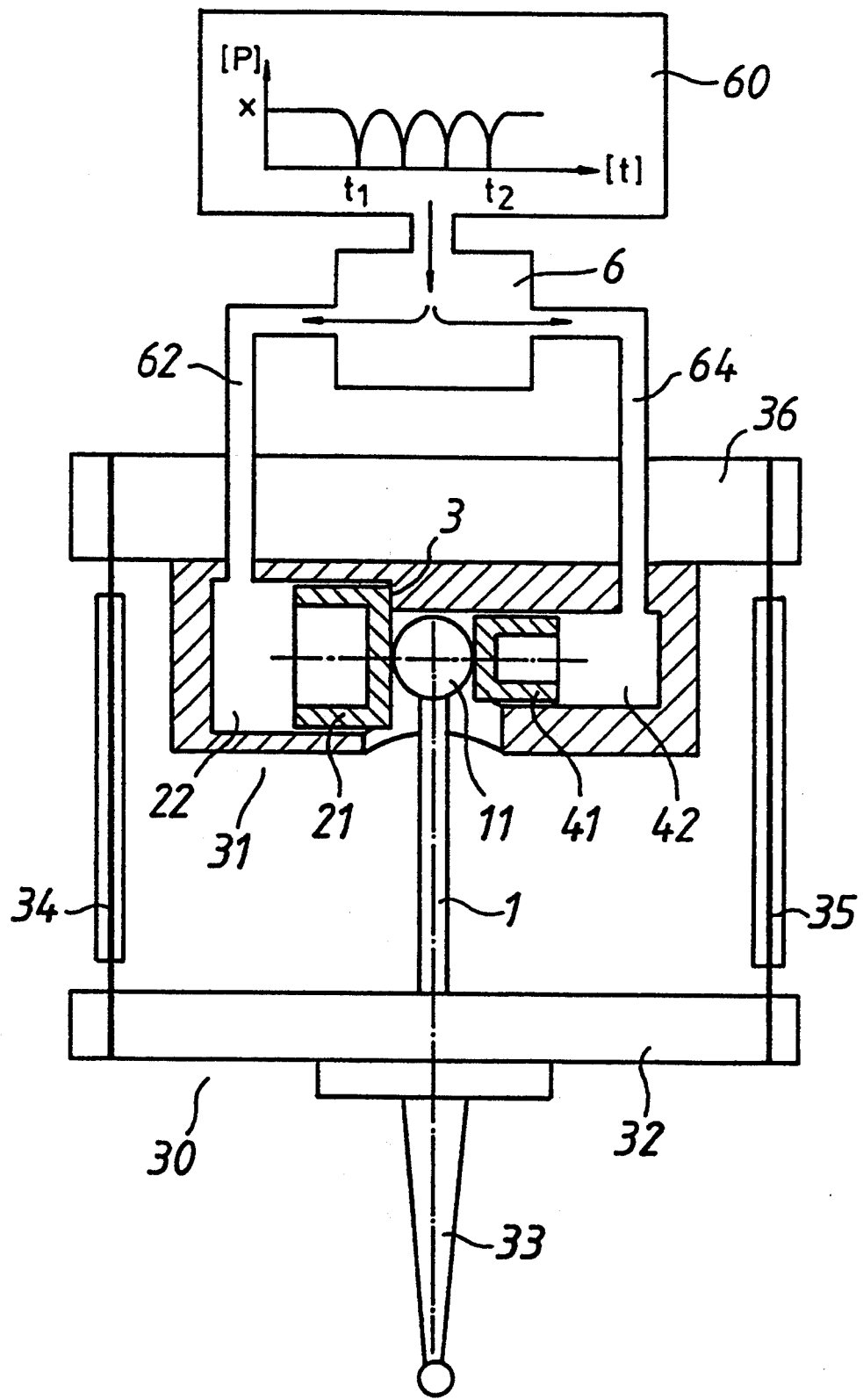
FIG. 3 shows a probe together with a centering device and shaking control means; and, FIG. 4 illustrates schematically a multipart stop.

FIG. 3 shows a mechanical probe 30 containing a centering device 31. A feeler 33, preferably in the form of a feeler pin, is fastened on a plate 32. The plate 32 is connected via a spring parallelogram guide 34/35 to a probe base 36 and via a driver 1 to the centering device 31. At the top of the driver a ball 11 is fastened, which is clamped between a first pressure member 21 and a second pressure member 41. The two pressure members are in the form of pistons moving in cylinders 22/42. A stop 3 is provided for the pressure member 21. The cylinders 22/42 are in communication with a common pressure tank 6 via pressure lines 62/64. The pressure tank 6 is connected to a feed, control and regulating device 60 of a type known per se.

According to the invention the device 60 controls the pressure p in the pressure tank 6 to decrease and increase periodically between a lower value and an upper value x during a short period of time $t_1$ to $t_2$. The lower value may for example be zero or even negative, that is to say a subatmospheric pressure. Otherwise, a constant value is maintained in the cylinders 22 and 42.

During the period of pulsating pressure the clamping of the ball 11 between the pressure members 21/41 is periodically released and restored, so that a shaking force is applied to the driver 1. Between the plane surfaces of the pressure members 21/41 and the surface of the ball and all running and stop surfaces of the pressure members only the lower motional friction thus still exists. With only two to three pressure pulses it was thus possible to achieve an increase of zero position accuracy to $+0.02$ $\mu$m.

The moment of time $t_1$ at which the pressure pulses are produced should preferably be directly before the sensing of the workpiece. This is because it has been observed that disadjustment of the zero position also results from the acceleration forces occurring when the probe is rapidly moved to the next measurement position and during braking before this measurement position is reached. The time taken for the slow approach to the work-piece to be measured in the respective measurement position is sufficient to bring the feeler into its improved zero position.

Other objects, features and advantages of the present invention will become apparent to those skilled in the art from the description above and from practice of the invention. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A centering device for a feeler pin in a mechanical probe comprising:
   a driver, connected to the feeler pin; and
   first and second restoring means acting on the driver in opposite directions,
   wherein only one stop is provided for the first restoring means and no stop is provided for the second restoring means, and
   wherein the first restoring means, which in a position of rest lies against the stop, exerts, at least close to the position of rest, a restoring force on the driver twice as great as that exerted by the second restoring means.

2. A centering device as claimed in claim 1, wherein the first and second restoring means are springs.

3. A centering device as claimed in claim 2, wherein the springs are coil springs.

4. A centering device as claimed in claim 1, wherein the first and second restoring means are first and second fluid pistons in first and second fluid cylinders.

5. A centering device as claimed in claim 4, wherein the cross-section of the first fluid piston acting against the stop is twice as large as the cross-section of the second fluid piston, and both the cylinders are connected to a common pressure tank.

6. A centering device as claimed in claim 4, wherein the fluid pistons are fluidically mounted in the cylinders.

7. A centering device as claimed in claim 4, wherein the fluid is compressed air.

8. A centering device as claimed in claim 1, including shaking means, connected to the first and second restoring means, for briefly exerting a shaking force on the driver.

9. A centering device as claimed in claim 8, wherein the shaking means includes control means for causing the shaking force to act shortly before a deflection of the driver.

10. A centering device as claimed in claim 8 wherein, when fluidic restoring means are used to exert fluid pressure, the fluid pressure is pulsating.

11. A centering device as claimed in claim 9 wherein, when fluidic restoring means are used to exert fluid pressure, the fluid pressure is pulsating.

12. A centering device as claimed in claim 1, wherein the stop is a multipart member.

* * * * *